UNITED STATES PATENT OFFICE.

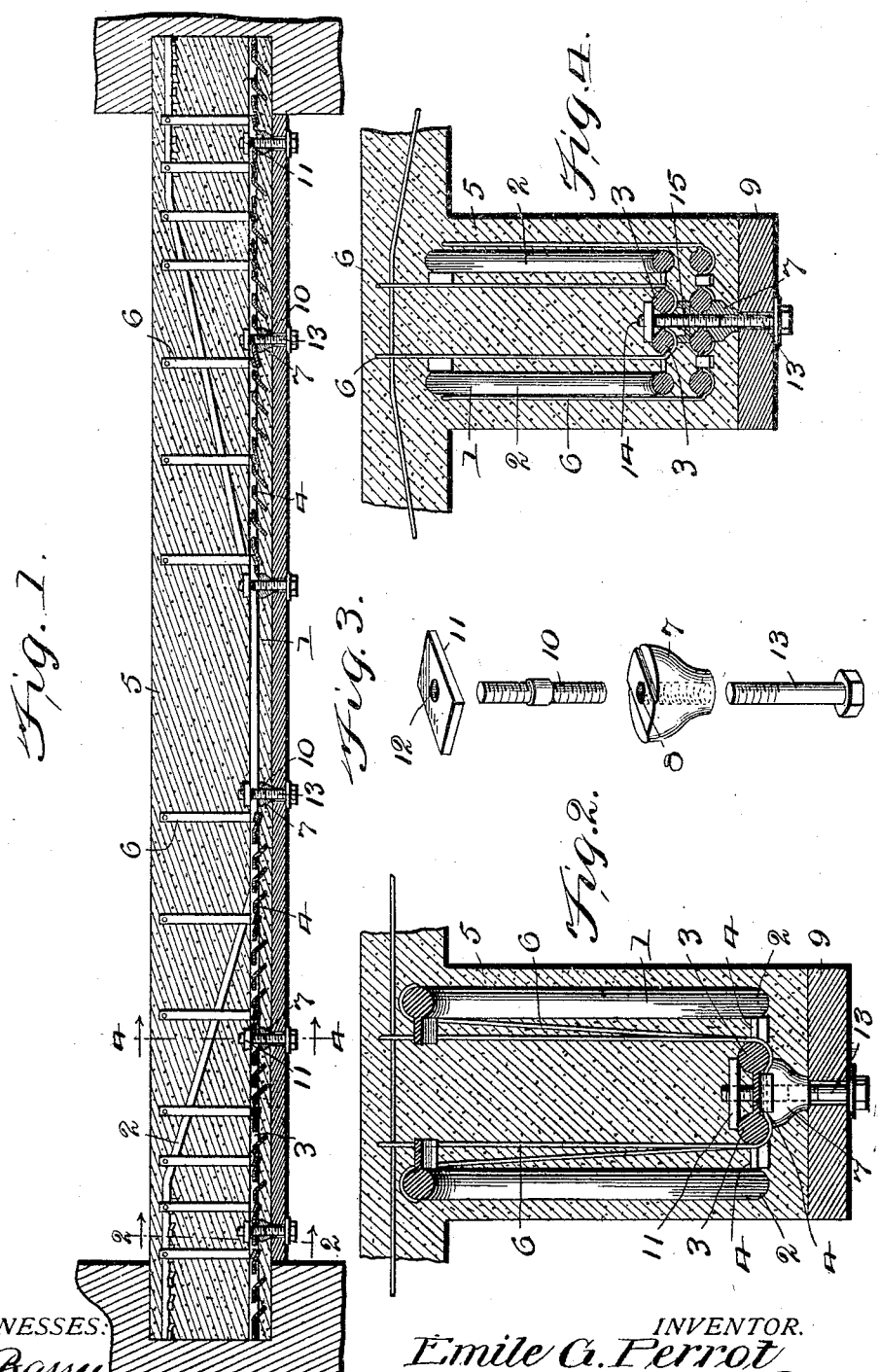

EMILE G. PERROT, OF PHILADELPHIA, PENNSYLVANIA, ASSIGNOR TO UNIT CONCRETE STEEL FRAME COMPANY, A CORPORATION OF NEW JERSEY.

FASTENING DEVICE FOR USE IN BUILDING CONSTRUCTION.

No. 806,832.     Specification of Letters Patent.     Patented Dec. 12, 1905.

Original application filed November 19, 1904, Serial No. 233,411. Divided and this application filed April 15, 1905. Serial No. 255,693.

*To all whom it may concern:*

Be it known that I, EMILE G. PERROT, a citizen of the United States, and a resident of the city of Philadelphia, State of Pennsylvania, have invented certain new and useful Improvements in Fastening Devices for Use in Building Constructions, &c., and particularly in means for holding the reinforcing cementitious parts—such as of beams, arches, &c.—in position, of which the following is a full, clear, and complete disclosure.

This application is a division of my prior application filed November 19, 1904, Serial No. 233,411, for building constructions.

One object of my invention is to provide such a socket or fastening means as can be easily placed in position and adjusted when used in connection with reinforcing parts for cementitious bodies or other uses in buildings where it is necessary to hold structural parts accurately and definitely in position during the construction, said fastening means also providing sockets which may be used to hold different objects employed within a building in position, while said sockets also serve to hold temporary structural parts, molds, or framework in a definite relation to the permanent structural or reinforcing parts themselves.

A further object of my invention is to provide such a form of support or socket that reinforcing bars or frames may be accurately located within the body of the cement in reinforced concrete structures, so as to enable the supporting strength of the structure to be accurately calculated and the location of the parts definitely determined.

A further object of my invention is to provide a fastening member which is capable of being adapted to engage structural elements of different sizes and number without the necessity of changes in form or design and proportion of parts for such different sizes and numbers.

Briefly, my invention comprises the use of a block or socket member which is engaged by means for holding the same in position in relation to a fixed support and for holding an object or structural part in position in relation to said socket. For a full, clear, and exact description of this form of my invention reference may be had to the following specification and to the accompanying drawings, forming a part thereof, in which—

Figure 1 is a longitudinal sectional view of a structural part and embodying this form of my invention. Fig. 2 is a transverse sectional view thereof, taken substantially upon the line 2 2, Fig. 1. Fig. 3 is a detailed perspective view of the parts of this form of my improved fastening device disassembled; and Fig. 4 is a transverse sectional view of a modified form of structural parts embodying a slightly-different form of my improved fastening device, said section being taken upon a line corresponding to the line 4 4, Fig. 1.

Referring to the drawings, the numeral 1 indicates the main reinforcing member, which is preferably composed of the bars 2 2, Fig. 2, which are connected by webs 4. The members 2 2 and 3 3 constitute longitudinal structural elements for the concrete structure, in this instance shown as a beam 5. The longitudinal elements 3 3 and 4 may also be engaged by a series of transverse or minor elements 6, and also may be constructed with other features necessary or preferable in this class of building constructions.

The fastening members which I have shown in connection with the above-described reinforcing elements are constructed as follows: The numeral 7 indicates a block or casting through which passes centrally a screw-threaded hole or opening 8. The outer end of this casting is adapted to engage the longitudinal members of the reinforcing-frame or other structural part with which the said fastening member is used, while its lower end is adapted to rest upon the upper surface of the mold or facing 9 of the beam or other support. A screw-threaded stud 10 is adapted to be passed into a screw-threaded opening 8 for part of its length, and the upper end of its stud is adapted to receive a plate or nut 11, having a screw-threaded opening 12 therein. This plate or nut 11 is adapted to engage the upper side of the reinforcing bars or elements and when screwed firmly in position holds said elements rigidly in engagement with the casting 7. As means for securing the casting or block 7 in position in relation to the mold or facing 9 I provide screws or bolts 13, which pass through the openings in said mold and enter the remainder of the screw-threaded opening 8 in the block 7. In placing the frame in position within the mold the casting 7 is first screwed firmly into position by means of the bolts 13, and the screw-threaded studs 10 are then inserted in the upper portion of the screw-threaded openings 8. The reinforcing-frame is then placed over said studs 10, said frame being made to accommodate said studs by having adjacent portions of the web removed, thereby leaving holes for the passage of the studs 10. The nuts or plates 11 are then screwed firmly into position, and the reinforcing members are ready to have the cement placed in the molds and tamped in position.

In order to accommodate any number of vertically-superimposed reinforcing elements, the stud 10 may be elongated, as indicated at 14, and suitable separators, as indicated at 15, interposed between the parallel members. It will also be evident that the upper end of the stud 10 may be so shaped as to engage different parts and forms of devices instead of using the screw-threaded nut 11. When used with reinforcing-frames for cementitious bodies, the cement when placed in position and allowed to sufficiently harden firmly unites all the parts of the frame, and it is evident that the bolts 13 may then be removed and the mold thereby disengaged from the structural part or beam, or if it is desired to have the lower portion of the mold form a yielding facing of the beam to which shaft-hangers, &c., may be attached the sides only of the mold are removed, and the bottom 9 is still allowed to be retained in position by the bolts 13.

It is obvious that the screw-threaded opening 8 may not extend continuously through the casting 7, but may consist of two independent screw-threaded sockets, the advantage of the continuous opening being that it is more easily formed. It is also obvious that a single block or casting may be provided with a plurality of openings or sockets 8 to receive a corresponding number of bolts 13 or studs 10.

Having thus described my invention, it will be obvious that other changes may be made in the form, arrangement, and proportion of parts without departing from the spirit and scope of my invention; but

What I claim, and desire to protect by Letters Patent, is—

1. Means for fixing a structural part or other device in position, comprising a block or casting, relatively movable means engaging said block or casting to hold the same in position on a fixed support, and other relatively movable means also engaging said block to hold said part permanently in position relative thereto.

2. Means for fixing a structural part or other device in position, comprising a block or casting having a socket, relatively movable means engaging said socket to hold said block in position on a fixed support, and other relatively movable means also engaging said block to hold said structural part or device permanently in position relative to said block.

3. Means for fixing a structural part or similar device in position, comprising a block or casting having a screw-threaded socket therein, means engaging said screw-threaded socket to hold said block in position upon its support, and other means also engaging said screw-threaded socket to hold said part in position relative to said block.

4. Means for fixing a structural part or other device in position, comprising a block or casting having screw-threaded sockets therein, means for engaging one of said sockets to hold said block in position on a suitable support, and means for engaging the other of said sockets to hold said part in position relative to said block.

5. Means for fixing a structural part or other device in position, comprising a block or casting having sockets therein, means for engaging one of said sockets to hold said block in position on its support, a screw-threaded stud engaging another of said sockets, and means carried by said stud to hold said part in position relative to said block.

6. Means for fixing a structural part or other device in position, comprising a block or casting having screw-threaded sockets therein, means for engaging one of said sockets to hold said block in position or on its support, a screw-threaded stud engaging other of said sockets, and nuts engaging said stud for holding said part or device in position relative to said block.

7. Means for fixing a structural part or device in position, comprising a block or casting having screw-threaded sockets therein, a bolt engaging one of said sockets to hold said block in position upon its support, a screw-threaded stud engaging other of said sockets, and a nut or plate engaging said stud to hold said device in position relative to said block.

8. Means for fixing a structural part or other device in position, comprising a block or casting having a central screw-threaded opening therein, means engaging said block to hold the same permanently in position upon its support, a screw-threaded stud adapted to enter said socket, means carried by said stud for holding said part in position relative to said block, and separators also carried by said stud.

In witness whereof I have hereunto set my hand this 12th day of April, 1905.

EMILE G. PERROT.

Witnesses:
 EDW. W. VAILL, Jr.,
 ALEXANDER PARK.